Oct. 19, 1954 — G. R. TREMOLADA — 2,692,152
SPLIT PACKING CARTRIDGE
Filed Feb. 6, 1951

INVENTOR.
GUGLIELMO R. TREMOLADA,
BY
ATTORNEY

Patented Oct. 19, 1954

2,692,152

UNITED STATES PATENT OFFICE 2,692,152

SPLIT PACKING CARTRIDGE

Guglielmo R. Tremolada, Los Angeles, Calif., assignor to Emsco Manufacturing Company, a corporation of California Application February 6, 1951, Serial No. 209,668

7 Claims. (Cl. 286—20)

1

My invention relates to packing or sealing means, and relates in particular to a cylindrical packing unit or cartridge which is split so that it may be assembled around a shaft from the side thereof and therefore may be used in devices wherein the shaft has its ends connected to other parts so that the packing cannot be slid onto the shaft from an end thereof.

As used in this specification the term "shaft" includes any solid or hollow rod which extends through an opening and is either held stationary, rotated and/or reciprocated.

It is an object of the invention to provide a packing cartridge for use on an intermediate portion of a shaft which will render a long period of service and have maximum sealing effect, within practical limits, with a minimum friction load applied to the shaft by the packing. This packing is intended for use in many places in substitution for packing devices wherein the seal around a shaft or piston rod is accomplished by packing material which is forced under heavy pressure against the surface of the shaft or rod and therefore, due to the friction load applied, consumes power in proportionately large amount.

It is an object of the invention to provide a packing consisting of a pair of semi-cylindrical parts having semi-circular lips extending outwardly for engagement with the shaft, each of these semi-circular lips on one part cooperating with a semi-circular lip on the other part so as to form a complete circular lip extending completely around and engaging the outer surface of the shaft, the abutting ends of the semi-circular lips being shaped in such a manner as to form a seal between the abutting surfaces at the ends of the semi-circular lips. This packing is in effect a plurality of sealing rings and supporting rings secured together so as to form a cylinder, which cylinder is separated into two parts along zig-zag lines so placed that the body portions of the sealing rings and also the lips thereof are divided along sloping planes and in such a manner that leakage between the ends of the body portions and also between the ends of the lips is prevented when the semi-cylindrical parts of the packing device are assembled in a packing chamber.

A further object of the invention is to provide a cylindrical split packing of the character described in the foregoing having means for aligning the ring units which enter into the composition of the packing.

A further object of the invention is to provide means for use in removal of packing from a packing chamber.

2

Further objects and advantages of the invention will be brought out in the following part of the specification wherein I have in detail described a preferred embodiment of the invention for the purpose of completeness of disclosure, without limiting the scope of the invention set forth in the appended claims or limiting the range of equivalents to which the claims are properly entitled.

Referring to the drawings which are for illustrative purposes only:

Figure 1:
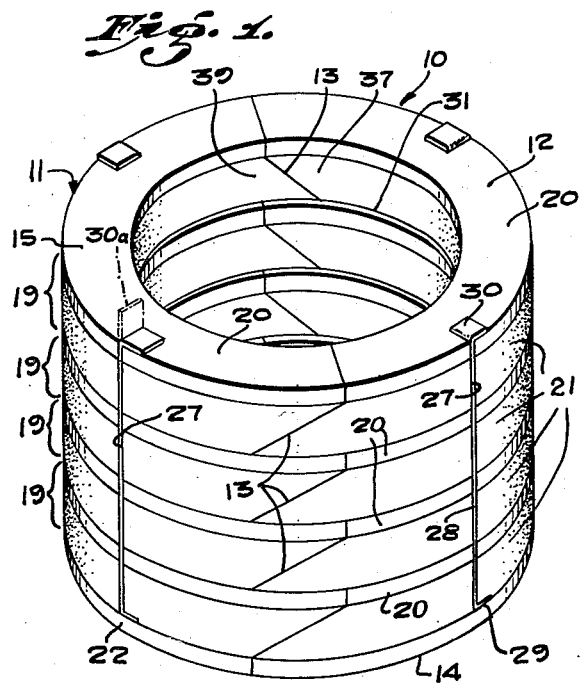
Fig. 1 is a perspective view looking at the low pressure end of a packing cartridge according to my invention.
Figure 2:
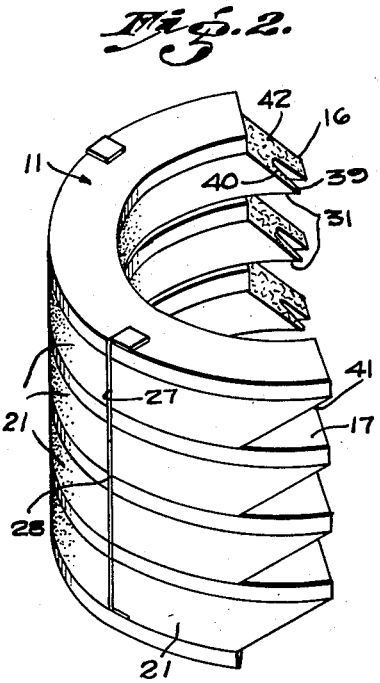
Fig. 2 is a perspective view showing one of the semi-cylindrical parts of the packing shown in Fig. 1.
Figures 3, 4:
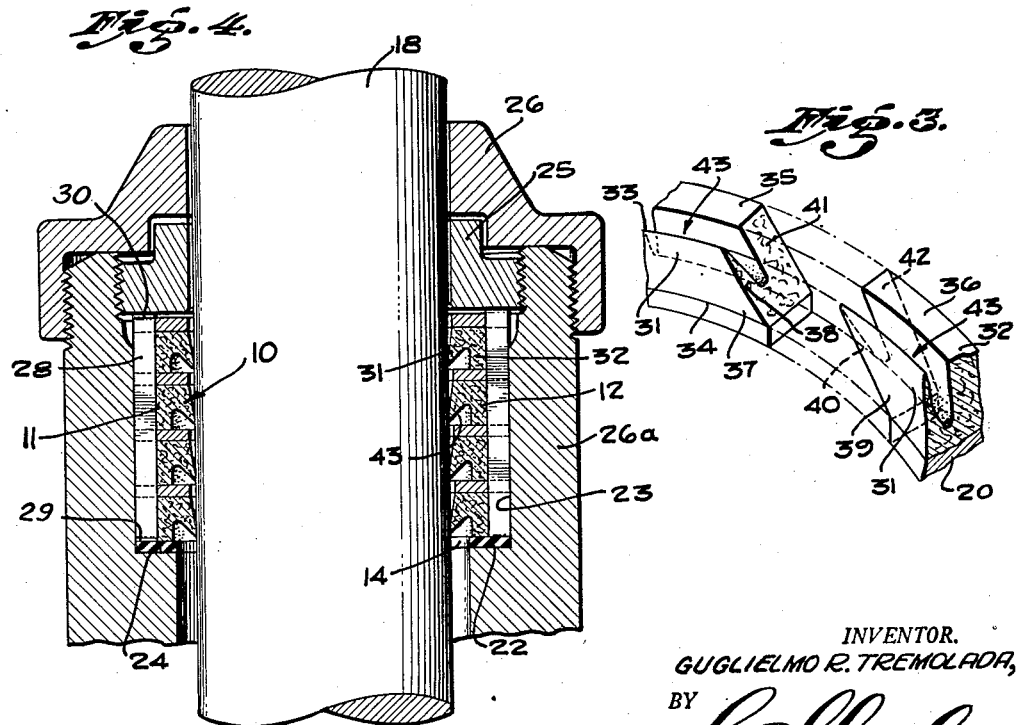
Fig. 3 is an enlarged fragmentary sectional view showing the portions of a ring unit which lie on opposite sides of a surface of separation, these parts being inverted so that the inclined surface of a wedge will be shown.
Fig. 4 is a fragmentary sectional view showing a packing chamber with a split packing installed therein around a shaft.

In Fig. 1 I show a cylindrical packing cartridge 10 comprising a pair of complementary and identical semi-cylindrical parts 11 and 12. The parts 11 and 12 are separated along two zig-zag surfaces of separation 13, each of these surfaces of separation extending from the high pressure end 14 to the low pressure end 15 of the cartridge 10. Each of the sections 11 and 12 has a plurality of points 16 adapted to project into corresponding recesses 17 when the parts 11 and 12 are assembled around a shaft 18 as shown in Fig. 4. The packing cartridge 10 is composed of a plurality of circular ring units 19, each of which units 19 comprises a metal supporting ring 20 and a circular packing section 21 adjacent the supporting ring 20. The packing cartridge 10 shown in Fig. 1 consists of four metal supporting rings 20 and four packing ring sections 21, forming four ring units 19 in end to end relation. At the high pressure end of the assembly of ring units 19 there is a divided rubber ring 22. When the packing unit 10 is placed in a packing chamber 23, Fig. 4, the rubber sealing ring 22 is forced against an annular shoulder 24 as the result of pressure applied to the outer end of the packing 10 by a threaded gland member 25 concealed by the cap 26 which is threaded onto the end of the structure 26a containing the packing chamber 23.

Each of the ring units 19 has a channel 27 therein parallel to the axis of the packing 10.

These channels 27 extend through the parts 20 and 21 and are aligned so as to form a continuous channel which will receive an aligning element 28, which, accordingly, has the function of aligning the parts 20 and 21 in the assembly thereof so that the wedges or points 16 will fit perfectly into the notches 17. The channels 27 are shown as narrow slots, and the aligning elements 28 consist of metal strips extended through the channels and having their ends 29 and 30 bent at right angles, so that the ends 29 will overlie portions of the surfaces of the lowermost ring parts 21, and the ends 30 will lie over portions of the uppermost supporting ring parts 20. When it is desired to remove the split packing from its position within the packing chamber 23, Fig. 4, the cap 26 and the gland member 25 may be removed. The ends 30 of the aligning elements 28 may be then bent outwardly into positions such as indicated by dotted lines 30a, Fig. 1, so that these ends 30 may be gripped by pulling means, thereby exerting a force upon the parts 11 and 12 to pull them out of the packing chamber 23, whereupon the parts 11 and 12 may be separated and removed from the shaft 18.

In Fig. 3 I have shown a portion of a packing ring section 21 inverted so as to give a good view of the sealing lip 31 which forms a part in each packing ring section. Each packing ring section 21 includes an annular body 32 and a sealing lip 31 which projects from one end of the body 32 toward the surface of the shaft 18 and diagonally toward the pressure end 14 of the packing cartridge 10. Each zig-zag surface of separation 13 shown in Fig. 1 extends through all of the parts 20, 21 and 22 from end to end of the packing cartridge 10, with the result that each ring or ring section is separated. An important characteristic of the packing ring sections 21 is that the portions of the surface of separation 13 which pass through the lips 31 are extended diagonally with respect to the upper and lower margins 33 and 34 of the lips 31, Fig. 3.

In Fig. 3 I have shown in spaced relation portions 35 and 36 of a packing ring section 21 disposed on opposite sides of the surface of separation 13. The ring section 21 is cut so that a wedge 37 is formed in a portion of the lip 31 comprising the portion 35 of the ring section 21 lying to the left of the surface of separation, this wedge 37 having an inclined face 38. On the opposite side of the surface of separation a tongue 39 is formed in the lip 31, this tongue having an inclined face 40 which lies in engagement with the inclined face 38 of the wedge 37 when the portions 35 and 36 of the ring section 21 are brought together as a result of the assembly of the parts 11 and 12, Fig. 1, around a shaft. In the preferred practice of the invention, as shown in Fig. 3, the portions of the annular body 32 lying on opposite sides of the surface of separation are diagonally disposed with respect to the upper and lower margins of the annular body 32, so that the portion 35 will include an inclined surface 41 positioned for engagement by an inclined surface 42 on the portion 36. When fluid pressure is applied to the inner face 43 of the lip 31, in the normal use of the packing cartridge, the lip 31 will be pressed against the surface of the shaft 18, and likewise the tongue 39 will be forced against the wedge 37 so that the inclined surfaces 38 and 39 will be pressed tightly together, forming a seal between the portions of the lips lying on the opposite side of the surface of separation.

I claim:

1. In a cylindrical split packing for use around a shaft: a plurality of ring units secured together in end to end relation, each of said ring units comprising a supporting ring and a ring section, each of said ring sections comprising an annular body portion and an annular lip extending from said body portion toward the surface of said shaft to make sealing engagement therewith, there being aligning slots in said ring sections which are aligned when said ring sections are properly placed in end to end relation, each of said ring units being separated on a transverse surface of separation which extends through said ring section transversely thereof and diagonally with respect to the upper and lower margins of said ring section and so that the portion of said lip on one side of said surface of separation comprises a wedge and the portion of said lip on the opposite side of said surface of separation comprises a tongue with an inclined surface to engage the inclined surface of said wedge and adapted to be pressed against said inclined surface of said wedge by fluid pressure when the packing is in use, and aligning means extending in said slots, said aligning means being prepared at the front thereof for engagement so that a pull may be exerted on the aligning means.

2. In a cylindrical split packing for use around a shaft: a plurality of ring sections secured together in end to end relation, each of said ring sections comprising an annular body portion and an annular lip extending from said body portion toward the surface of said shaft to make sealing engagement therewith, there being aligning channels in the outer faces of the body portion of said ring sections which are aligned when said ring sections are properly placed in end to end relation, each of said ring sections being separated on a transverse surface of separation which extends through said lip diagonally with respect to the upper and lower margins thereof so that the portion of said lip on one side of said surface of separation comprises a wedge and the portion of said lip on the opposite side of said surface of separation comprises a tongue with an inclined surface to engage the inclined surface of said wedge and adapted to be pressed against said inclined surface of said wedge by fluid pressure when the packing is in use, and aligning means extending in said channels.

3. In a cylindrical split packing for use around a shaft: a plurality of ring units secured together in end to end relation, each of said ring units comprising a supporting ring and a ring section, each of said ring sections comprising an annular body portion and an annular lip extending from said body portion toward the surface of said shaft to make sealing engagement therewith, there being aligning channels in the outer faces of the body portion of said ring sections which are aligned when said ring sections are properly placed in end to end relation, each of said ring units being separated on a transverse surface of separation which extends through said ring section transversely thereof and diagonally with respect to the upper and lower margins of said ring section and so that the portion of said lip on one side of said surface of separation comprises a wedge and the portion of said lip on the opposite side of said surface of separation comprises a tongue with an inclined surface to engage the inclined surface of said wedge and adapted to be pressed against said inclined surface of said wedge by fluid pressure when the packing is in use, and aligning means extending in said channels, said aligning means being prepared at the front thereof for engagement so that a pull may be exerted on the aligning means.

4. In a cylindrical split packing for use around a shaft: a plurality of ring sections secured together in end to end relation, each of said ring sections comprising an annular body portion and an annular lip extending from said body portion toward the surface of said shaft to make sealing engagement therewith, there being aligning channels in the outer faces of the body portion of said ring sections which are aligned when said ring sections are properly placed in end to end relation; metal strips extending through said channels and beyond the ends of the packing assembly, the extended end portions of said strips being turned so as to overlie portions of the end surfaces of the outermost ring parts.

5. A split packing assembly comprising a plurality of coaxial packing rings arranged in end to end relation, each of said packing rings being of uniform axial thickness and comprising a packing portion of flexible material and a flat supporting ring at one end of said packing portion, each of said packing portions comprising an annular body portion with an annular lip extending therefrom, said lips extending from their respective body portions in a common direction, the extreme periphery of any of said lips being of a diameter which is equal to that of any other of said lips, each of said packing rings being formed of separable sections, the ends of said sections being inclined in the packing portions thereof and axial in the supporting ring portions thereof.

6. A split packing assembly comprising a plurality of coaxial packing rings secured together in end to end relation, each of said packing rings being of uniform axial thickness and comprising a packing portion of flexible material and a flat supporting ring at one end of said packing portion, each of said packing portions comprising an annular body portion with an annular lip extending therefrom, said lips extending from their respective body portions in a common direction, the extreme periphery of any of said lips being of a diameter which is equal to that of any other of said lips, each of said packing rings being formed of semi-circular sections, the ends of said sections being inclined in the packing portions thereof, the plane of inclination of the end of the packing portion of any section in any ring being parallel to that in an adjacent ring, whereby said packing assembly is separable into meshing halves.

7. A packing assembly comprising a plurality of coaxial packing rings secured together in end to end relation, each of said packing rings being of uniform axial thickness and comprising an annular body portion of flexible material with an annular lip of flexible material, said lips extending from their respective body portions in a common direction, aligning channels in the faces of the body portion of said packing rings opposite to said lips, said channels being aligned when said rings are properly placed in end to end relation, metal strips extending through said channels and beyond the ends of the packing assembly, the extended end portions of said strips being turned so as to overlie portions of the end surfaces of the outermost ring parts.

References Cited in the file of this patent

UNITED STATES PATENTS

| Number | Name | Date |
| --- | --- | --- |
| 205,165 | Woodruff | June 18, 1878 |
| 1,359,170 | Hatfield | Nov. 16, 1920 |
| 1,968,650 | Mastin | July 31, 1934 |
| 2,100,113 | Travis | Nov. 23, 1927 |
| 2,233,902 | Schmied | Mar. 4, 1941 |
| 2,417,107 | Gregoire | Mar. 11, 1947 |